(12) United States Patent
Miyakoshi et al.

(10) Patent No.: US 11,007,847 B2
(45) Date of Patent: May 18, 2021

(54) VEHICLE AIR CONDITIONING DEVICE

(71) Applicant: SANDEN AUTOMOTIVE CLIMATE SYSTEMS CORPORATION, Isesaki (JP)

(72) Inventors: Ryo Miyakoshi, Isesaki (JP); Kenichi Suzuki, Isesaki (JP); Kohei Yamashita, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 6 days.

(21) Appl. No.: 15/580,037

(22) PCT Filed: Jun. 1, 2016

(86) PCT No.: PCT/JP2016/066119
§ 371 (c)(1),
(2) Date: Dec. 6, 2017

(87) PCT Pub. No.: WO2016/208338
PCT Pub. Date: Dec. 29, 2016

(65) Prior Publication Data
US 2018/0297446 A1     Oct. 18, 2018

(30) Foreign Application Priority Data
Jun. 26, 2015   (JP) .............................. JP2015-128553

(51) Int. Cl.
*B60H 1/00*      (2006.01)
*B60H 1/22*      (2006.01)

(52) U.S. Cl.
CPC ....... *B60H 1/00921* (2013.01); *B60H 1/2221* (2013.01); *B60H 2001/00957* (2013.01);
(Continued)

(58) Field of Classification Search
CPC .............. B60H 1/00921; B60H 1/2221; B60H 2001/00957; B60H 2001/2237; B60H 2001/2287; Y02T 10/88
(Continued)

(56) References Cited

U.S. PATENT DOCUMENTS 6,192,695 B1   2/2001   Hirota
6,209,331 B1   4/2001   Lake et al.
(Continued)

FOREIGN PATENT DOCUMENTS

CN    1524720    9/2004
CN    1692258    11/2005
(Continued)

OTHER PUBLICATIONS

Office Action dated May 21, 2019 issued in Japanese Patent Application No. 2015-128553.
(Continued)

*Primary Examiner* — Tho V Duong
*Assistant Examiner* — Raheena R Malik
(74) *Attorney, Agent, or Firm* — Cozen O'Connor

(57) ABSTRACT

Vehicle air conditioning device of a heat pump system in which comfort is compatible with decrease of power consumption. The vehicle air conditioning device includes a heating medium circulating circuit 23 to heat air to be supplied from an air flow passage 3 to a vehicle interior, and in a heating mode, a controller has an energy saving prior mode in which the controller operates a compressor 2 at a maximum number of revolution and complements a shortage of a heating capability by a radiator 4 with heating by a heating medium-air heat exchanger 40 of the heating medium circulating circuit 23, and a comfort prior mode in which the controller limits a number of revolution of the compressor 2 and complements the shortage of the heating
(Continued)

capability by the radiator 4 with the heating by the heating medium-air heat exchanger 40 of the heating medium circulating circuit 23.

11 Claims, 8 Drawing Sheets

(52) U.S. Cl.
CPC ............... *B60H 2001/2237* (2013.01); *B60H 2001/2287* (2013.01); *Y02T 10/88* (2013.01)

(58) Field of Classification Search
USPC ........................................................ 165/202
See application file for complete search history.

(56) References Cited

U.S. PATENT DOCUMENTS

| 2003/0172667 | A1  | 9/2003 | Takano et al. |            |
|--------------|-----|--------|---------------|------------|
| 2013/0206382 | A1* | 8/2013 | Ichishi       | B60N 2/5628 |
|              |     |        |               | 165/203    |
| 2016/0031288 | A1* | 2/2016 | Nishikawa     | F01P 3/20  |
|              |     |        |               | 165/202    |
| 2016/0101666 | A1* | 4/2016 | Sugimura      | B60H 1/00899 |
|              |     |        |               | 165/202    |
| 2016/0137024 | A1* | 5/2016 | Yoshida       | B60H 1/0075 |
|              |     |        |               | 165/202    |
| 2016/0185185 | A1* | 6/2016 | Suzuki        | B60H 1/00921 |
|              |     |        |               | 237/5      |

FOREIGN PATENT DOCUMENTS

| CN | 203375582 U | 1/2014 |
| JP | 5-178061 | 7/1993 |
| JP | H 07-158936 | 6/1995 |
| JP | 7-223428 | 8/1995 |
| JP | 11-235919 | 8/1999 |
| JP | 2004-132610 | 4/2004 |
| JP | 2008-120381 | 5/2008 |
| JP | 2012-96634 | 5/2012 |
| JP | 2013-231522 | 11/2013 |
| JP | 2014-213765 | 11/2014 |

OTHER PUBLICATIONS

Office Action dated Nov. 10, 2020 issued in Chinese Patent Application No. 201680036806.3.

\* cited by examiner

VEHICLE AIR CONDITIONING DEVICE

RELATED APPLICATIONS

This is a U.S. National Phase Application under 35 USC 371 of International Application PCT/JP2016/066119 filed on Jun. 1, 2016.

This application claims the priority of Japanese application no. 2015-128553 filed Jun. 26, 2015, the entire content of which is hereby incorporated by reference.

TECHNICAL FIELD

The present invention relates to an air conditioning device of a heat pump system which conditions air of a vehicle interior, and more particularly, it relates to a vehicle air conditioning device which is suitable for a hybrid car or an electric vehicle.

BACKGROUND ART

Due to actualization of environmental problems in recent years, hybrid cars and electric vehicles have spread. Further, as an air conditioning device which is applicable to such a vehicle, there has been developed an air conditioning device including a compressor to which power is supplied from a battery of the vehicle to compress and discharge a refrigerant, a radiator disposed in an air flow passage through which air to be supplied to a vehicle interior flows to let the refrigerant radiate heat, a heat absorber disposed in the air flow passage to let the refrigerant absorb heat, and an outdoor heat exchanger disposed outside the vehicle interior to let the refrigerant radiate heat or absorb heat, and there are changed and executed respective modes of a heating mode to let the refrigerant discharged from the compressor radiate heat in the radiator and let the refrigerant from which the heat has been radiated in this radiator absorb heat in the outdoor heat exchanger, a dehumidifying and heating or dehumidifying and cooling mode to let the refrigerant discharged from the compressor radiate heat in the radiator and let the refrigerant from which the heat has been radiated in the radiator absorb heat in the heat absorber, and a cooling mode to let the refrigerant discharged from the compressor radiate heat in the outdoor heat exchanger and let the refrigerant absorb heat in the heat absorber (e.g., see Patent Document 1).

Furthermore, in Patent Document 1, a heating medium-air heat exchanger (auxiliary heating means) is disposed in the air flow passage, and when a heating capability by the radiator runs short to a required capability in the heating mode, a heating medium heated by an electric heater to which the power is supplied from the battery circulates through the heating medium-air heat exchanger to heat the air to be supplied to the vehicle interior, thereby complementing the shortage.

CITATION LIST

Patent Documents

Patent Document 1: Japanese Patent Application Publication No. 2014-213765

SUMMARY OF THE INVENTION

Problems to be Solved by the Invention

However, in the case of complementing a heating capability by an auxiliary heating means as described above, there are present an infinite number of ratios between the heating capability by a radiator and the heating capability by the auxiliary heating means (an electric heater and a heating medium-air heat exchanger) for the purpose of satisfying a required capability. For example, in Patent Document 1 mentioned above, a maximum heating capability generable by the radiator is estimated, and the auxiliary heating means performs heating for a shortage of this estimated value to the required capability. Although energization to the electric heater is minimized to achieve energy saving, the heating capability is not immediately obtainable at any cost on startup of a compressor. Therefore, comfort is impaired, and noise due to a large compressor number of revolution or frosting to an outdoor heat exchanger causes problems.

To eliminate the above problems, when the compressor number of revolution is limited to suppress the heating capability by the radiator and the heating by the auxiliary heating means increases, conformity on the startup of the compressor or the like improves. Furthermore, although the problems of the noise and the frosting to the outdoor heat exchanger are inhibited, power consumption increases to cause a fatal problem especially in an electric vehicle.

Furthermore, as described above, in Patent Document 1, the maximum heating capability generable by the radiator is estimated, and the heating is performed by the auxiliary heating means for the shortage of the estimated value to the required capability, but due to influences of the frosting to the outdoor heat exchanger and the like, there is the possibility that the heating capability actually generable by the radiator decreases, and hence it is difficult to accurately complement the shortage with the auxiliary heating means. In consequence, it is also considered that in actual, the heating capability by the auxiliary heating means runs short to impair the comfort.

The present invention has been developed to solve such conventional technical problems, and an object thereof is to provide a vehicle air conditioning device of a so-called heat pump system in which comfort is compatible with decrease of power consumption.

Means for Solving the Problems

A vehicle air conditioning device of the invention of claim 1 includes a compressor to compress a refrigerant, an air flow passage through which air to be supplied to a vehicle interior flows, a radiator to let the refrigerant radiate heat, thereby heating the air to be supplied from the air flow passage to the vehicle interior, an outdoor heat exchanger disposed outside the vehicle interior to let the refrigerant absorb heat, and a control means, so that this control means lets the refrigerant discharged from the compressor radiate heat in the radiator, and decompresses the refrigerant from which the heat has been radiated, to let the refrigerant absorb heat in the outdoor heat exchanger, thereby heating the vehicle interior, and the vehicle air conditioning device further includes an auxiliary heating means for heating the air to be supplied from the air flow passage to the vehicle interior and is characterized in that the control means has an energy saving prior mode in which the control means operates the compressor at a maximum number of revolution and complements a shortage of a heating capability by the radiator with the heating by the auxiliary heating means, and a comfort prior mode in which the control means limits a number of revolution of the compressor and complements the shortage of the heating capability by the radiator with the heating by the auxiliary heating means.

The vehicle air conditioning device of the invention of claim 2 is characterized in that in the above invention, power is supplied to the compressor and the auxiliary heating means from a battery of a vehicle, and the control means is configured to execute the comfort prior mode when a remaining amount of the battery has a predetermined value or more.

The vehicle air conditioning device of the invention of claim 3 is characterized in that in the above respective inventions, in the energy saving prior mode, the control means calculates a required capability TGQ that is a required heating capability of the radiator, an HP maximum capability estimated value Qmax that is an estimated value of a maximum heating capability of the radiator, a total capability Qtotal that is a total heating capability to be actually generated by the radiator and the auxiliary heating means, a difference $\Delta Qmax = TGQ - Qmax$ which is the difference between the required capability TGQ and the HP maximum capability estimated value Qmax, and a difference $\Delta Qtotal = TGQ - Qtotal$ which is the difference between the required capability TGQ and the total capability Qtotal, and obtains a required capability TGQhtr of the auxiliary heating means from the difference $\Delta Qmax$+the difference $\Delta total$, to execute the heating by the auxiliary heating means.

A vehicle air conditioning device of the invention of claim 4 includes a compressor to compress a refrigerant, an air flow passage through which air to be supplied to a vehicle interior flows, a radiator to let the refrigerant radiate heat, thereby heating the air to be supplied from the air flow passage to the vehicle interior, an outdoor heat exchanger disposed outside the vehicle interior to let the refrigerant absorb heat, and a control means, so that the control means lets the refrigerant discharged from the compressor radiate heat in the radiator, and decompresses the refrigerant from which the heat has been radiated, to let the refrigerant absorb heat in the outdoor heat exchanger, thereby heating the vehicle interior, and the vehicle air conditioning device further includes an auxiliary heating means for heating the air to be supplied from the air flow passage to the vehicle interior and is characterized in that the control means calculates a required capability TGQ that is a required heating capability of the radiator, an HP maximum capability estimated value Qmax that is an estimated value of a maximum heating capability of the radiator, a total capability Qtotal that is a total heating capability to be actually generated by the radiator and the auxiliary heating means, a difference $\Delta Qmax = TGQ - Qmax$ which is the difference between the required capability TGQ and the HP maximum capability estimated value Qmax, and a difference $\Delta Qtotal = TGQ - Qtotal$ which is the difference between the required capability TGQ and the total capability Qtotal, and obtains a required capability TGQhtr of the auxiliary heating means from the difference $\Delta Qmax$+the difference $\Delta Qtotal$, to execute the heating by the auxiliary heating means.

The vehicle air conditioning device of the invention of claim 5 is characterized in that in the invention of claim 3 or claim 4, the control means obtains the required capability TGQhtr of the auxiliary heating means from the difference $\Delta Qmax$, to execute the heating by the auxiliary heating means, when the difference $\Delta Qtotal$ between the required capability TGQ and the total capability Qtotal is smaller than a predetermined value.

The vehicle air conditioning device of the invention of claim 6 is characterized in that in the inventions of claim 3 to claim 5, the control means calculates a target value of a high pressure on the basis of a target outlet temperature that is a target value of a temperature of air to be blown out to the vehicle interior, and increases the required capability TGQhtr of the auxiliary heating means so that the high pressure reaches the target value.

The vehicle air conditioning device of the invention of claim 7 is characterized in that in the inventions of claim 3 to claim 6, in the case of stopping the compressor, the control means obtains the required capability TGQhtr of the auxiliary heating means from the required capability TGQ, to execute the heating by the auxiliary heating means.

The vehicle air conditioning device of the invention of claim 8 is characterized in that in the invention of claim 1 or claim 2, in the comfort prior mode, the control means calculates a required capability TGQ that is a required heating capability of the radiator, an HP actual capability Qhp that is a heating capability to be actually generated by the radiator, and a difference $\Delta Qhp = TGQ - Qhp$ which is the difference between the required capability TGQ and the HP actual capability Qhp, and obtains a required capability TGQhtr of the auxiliary heating means from the difference $\Delta Qhp$, to execute the heating by the auxiliary heating means.

The vehicle air conditioning device of the invention of claim 9 is characterized in that in the above invention, in the case of stopping the compressor, the control means obtains the required capability TGQhtr of the auxiliary heating means from the required capability TGQ, to execute the heating by the auxiliary heating means.

The vehicle air conditioning device of the invention of claim 10 is characterized in that in claim 1, claim 2, claim 8 or claim 9, in the comfort prior mode, the control means calculates a target value of a high pressure on the basis of a target outlet temperature that is a target value of a temperature of air to be blown out to the vehicle interior, calculates a high pressure calculation number of revolution TGNChp of the compressor so that the high pressure reaches the target value, and controls the operation of the compressor on the basis of a smaller value which is selected, as a target number of revolution TGNC of the compressor, from values of the high pressure calculation number of revolution TGNChp and a predetermined upper limit number of revolution TGNCcomf of the compressor in the comfort prior mode.

The vehicle air conditioning device of the invention of claim 11 is characterized in that in the above invention, the control means changes the upper limit number of revolution TGNCcomf on the basis of a velocity, an index indicating a volume of air flowing through the air flow passage, and a frosting degree of the outdoor heat exchanger.

Advantageous Effect of the Invention

According to the invention of claim 1, a vehicle air conditioning device includes a compressor to compress a refrigerant, an air flow passage through which air to be supplied to a vehicle interior flows, a radiator to let the refrigerant radiate heat, thereby heating the air to be supplied from the air flow passage to the vehicle interior, an outdoor heat exchanger disposed outside the vehicle interior to let the refrigerant absorb heat, and a control means, so that this control means lets the refrigerant discharged from the compressor radiate heat in the radiator, and decompresses the refrigerant from which the heat has been radiated, to let the refrigerant absorb heat in the outdoor heat exchanger, thereby heating the vehicle interior, and the vehicle air conditioning device further includes an auxiliary heating means for heating the air to be supplied from the air flow passage to the vehicle interior, and in the vehicle air conditioning device, the control means has an energy saving prior mode in which the control means operates the compressor at a maximum number of revolution and complements a shortage of a heating capability by the radiator with the heating by the auxiliary heating means, and a comfort prior mode in which the control means limits a number of revolution of the compressor and complements the shortage of the heating capability by the radiator with the heating by the auxiliary heating means. Consequently, in the energy saving prior mode, the control means can let the radiator exert the maximum heating capability and complement the shortage with the heating by the auxiliary heating means, thereby achieving decrease of power consumption, and in the comfort prior mode, the control means can limit the heating capability by the radiator, and increase the heating by the auxiliary heating means to accelerate rising of the heating capability on startup or the like, thereby reducing noise and inhibiting frosting to the outdoor heat exchanger.

That is, it is possible to change whether to perform the vehicle interior heating in which priority is placed on energy saving or to perform the vehicle interior heating in which priority is placed on comfort, in accordance with passenger's preference or a vehicle situation, and it is possible to achieve the vehicle interior heating in which the comfort is compatible with the decrease of the power consumption.

In this case, as in the invention of claim 2, the control means is configured to execute the comfort prior mode when a remaining amount of a battery of a vehicle has a predetermined value or more, and consequently, due to the execution of the comfort prior mode, there is effectively avoidable the disadvantage that the battery remaining amount of power to be supplied to the compressor or the auxiliary heating means runs out. Therefore, the invention is remarkably effective especially in an electric vehicle.

Furthermore, as in the energy saving prior mode of the invention of claim 3, or the invention of claim 4, the control means calculates a required capability TGQ that is a required heating capability of the radiator, an HP maximum capability estimated value Qmax that is an estimated value of a maximum heating capability of the radiator, a total capability Qtotal that is a total heating capability to be actually generated by the radiator and the auxiliary heating means, a difference ΔQmax=TGQ−Qmax which is the difference between the required capability TGQ and the HP maximum capability estimated value Qmax, and a difference ΔQtotal=TGQ−Qtotal which is the difference between the required capability TGQ and the total capability Qtotal, and obtains a required capability TGQhtr of the auxiliary heating means from the difference ΔQmax+the difference ΔQtotal, to execute the heating by the auxiliary heating means. Consequently, also when the required capability TGQ is not actually achievable with the difference ΔQmax between the required capability and the HP maximum capability estimated value Qmax due to frosting to the outdoor heat exchanger, or the like, it is possible to accurately compensate for the shortage with the difference ΔQtotal between the required capability and the total capability Qtotal to be actually generated by the radiator and the auxiliary heating means, and the complementation of the heating capability for the comfort by the auxiliary heating means is achievable.

In this case, as in the invention of claim 5, the control means obtains the required capability TGQhtr of the auxiliary heating means from the difference ΔQmax, to execute the heating by the auxiliary heating means, when the difference ΔQtotal between the required capability TGQ and the total capability Qtotal is smaller than a predetermined value. Consequently, when the total capability Qtotal actually generated by the radiator and the auxiliary heating means substantially satisfies the required capability TGQ, the control means controls the auxiliary heating means only with the difference ΔQmax between the required capability TGQ and the HP maximum capability estimated value Qmax, and it is possible to simplify the control of the auxiliary heating means.

Furthermore, as in the invention of claim 6, the control means calculates a target value of a high pressure on the basis of a target outlet temperature that is a target value of a temperature of air to be blown out to the vehicle interior, and increases the required capability TGQhtr of the auxiliary heating means so that the high pressure reaches the target value. Consequently, for example, when the high pressure is lower than the target value even at the maximum number of revolution of the compressor which is allowed at this time, or when the high pressure is lower than the target value due to low pressure protection of the compressor or the like, the control means increases the heating by the auxiliary heating means to raise the pressure of the radiator, and it is possible to bring the high pressure close to the target value.

Additionally, as in the invention of claim 7, in the case of stopping the compressor, the control means obtains the required capability TGQhtr of the auxiliary heating means from the required capability TGQ, to execute the heating by the auxiliary heating means. Consequently, when the compressor is to be stopped due to increase of the frosting to the outdoor heat exchanger or another factor, the comfortable vehicle interior heating is achievable with the heating by the auxiliary heating means without hindrance.

According to the invention of claim 8, in the comfort prior mode of the invention of claim 1 or claim 2, the control means calculates a required capability TGQ that is a required heating capability of the radiator, an HP actual capability Qhp that is a heating capability to be actually generated by the radiator, and a difference ΔQhp=TGQ−Qhp which is the difference between the required capability TGQ and the HP actual capability Qhp, and obtains a required capability TGQhtr of the auxiliary heating means from the difference ΔQhp, to execute the heating by the auxiliary heating means. Consequently, it is possible to accurately complement the shortage of the HP actual capability Qhp that is the radiator heating capability actually generated at the limited compressor number of revolution, to the required capability TGQ, with the heating by the auxiliary heating means, and extremely comfortable vehicle interior heating is achievable.

Also in this case, as in the invention of claim 9, in the case of stopping the compressor, the control means obtains the required capability TGQhtr of the auxiliary heating means from the required capability TGQ, to execute the heating by the auxiliary heating means. Consequently, when the compressor is similarly to be stopped due to the increase of the frosting to the outdoor heat exchanger or the other factor, the comfortable vehicle interior heating is achievable with the heating by the auxiliary heating means without hindrance.

Furthermore, as in the invention of claim 10, in the comfort prior mode, the control means calculates a target value of a high pressure on the basis of a target outlet temperature that is a target value of a temperature of air to be blown out to the vehicle interior, calculates a high pressure calculation number of revolution TGNChp of the compressor so that the high pressure reaches the target value, and controls the operation of the compressor on the basis of a smaller value which is selected, as a target number of revolution TGNC of the compressor, from values of the high pressure calculation number of revolution TGNChp and a predetermined upper limit number of revolution TGNCcomf of the compressor in the comfort prior mode. Consequently, the limitation of the number of revolution in the comfort prior mode is achievable while securing the control of the inherent compressor number of revolution on the basis of the high pressure.

In this case, as in the invention of claim 11, the control means changes the upper limit number of revolution TGNCcomf of the compressor in the comfort prior mode on the basis of a velocity, an index indicating a volume of air flowing through the air flow passage, and a frosting degree of the outdoor heat exchanger. Consequently, for example, the control means increases the upper limit number of revolution TGNCcomf as the velocity is higher and as the volume of the air through the air flow passage is larger, so that the heating capability of the radiator increases to decrease the power consumption as much as possible in a situation where the noise is hardly a concern. On the other hand, the control means decreases the upper limit number of revolution TGNCcomf as the outdoor heat exchanger is frosted more, so that it is possible to inhibit progress of the frosting to the outdoor heat exchanger.

MODE FOR CARRYING OUT THE INVENTION

Hereinafter, description will be made as to an embodiment of the present invention in detail with reference to the drawings.

Figure 1:
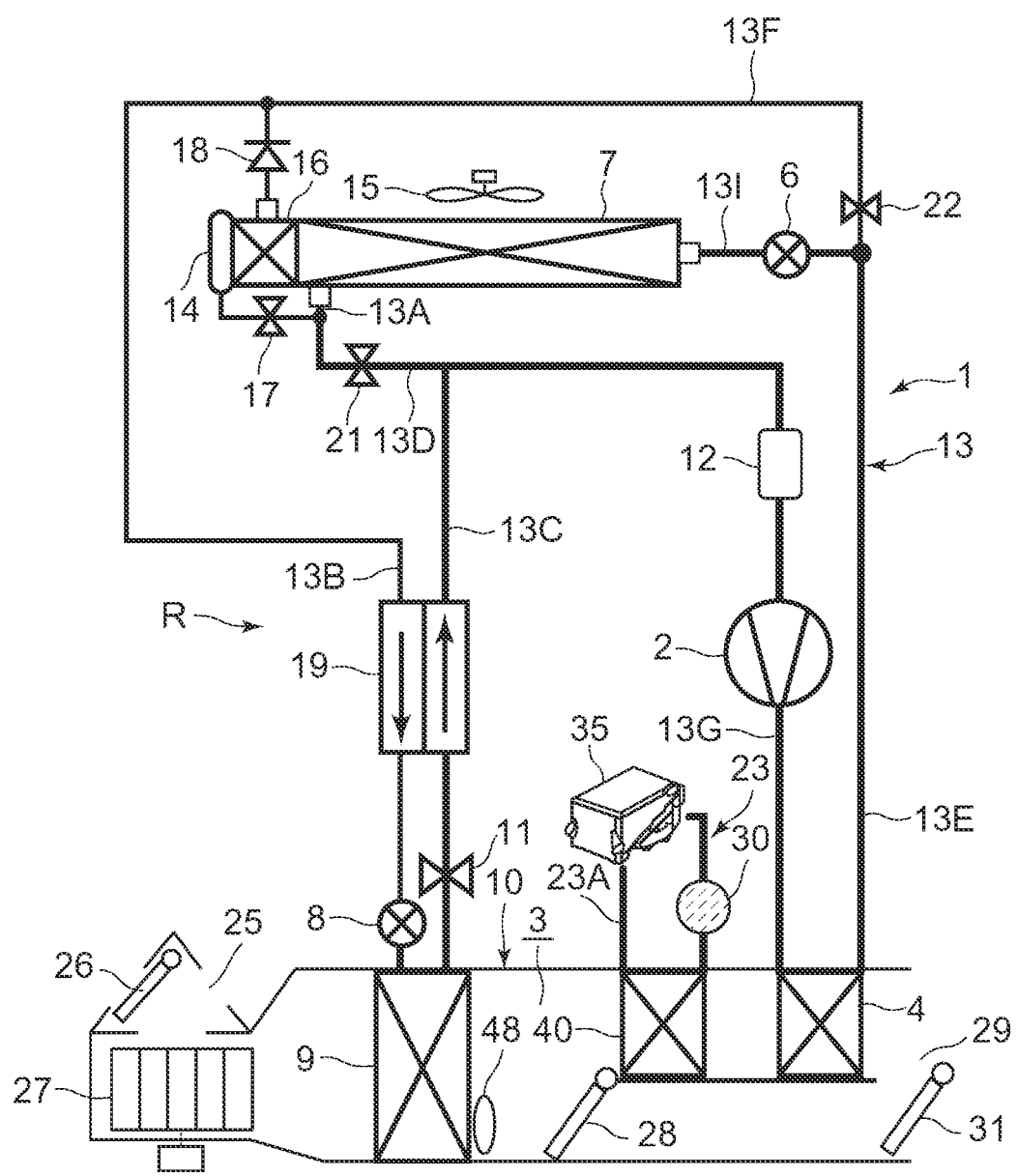
FIG. 1 is a constitutional view of a vehicle air conditioning device of one embodiment to which the present invention is applied.

FIG. 1 shows a constitutional view of a vehicle air conditioning device 1 as one embodiment of the present invention. In this case, a vehicle of the embodiment to which the present invention is applied is an electric vehicle (EV) which does not have an engine (an internal combustion engine), and runs with an electric motor for running which is driven by power charged in a battery (which is not shown in the drawing), and the vehicle air conditioning device 1 of the present invention is also driven by the power of the battery.

Specifically, in the electric vehicle which is not capable of performing heating by engine waste heat, the vehicle air conditioning device 1 of the embodiment performs heating by a heat pump operation in which a refrigerant circuit is used, and furthermore, the device selectively executes respective operation modes of dehumidifying and heating, dehumidifying and cooling, cooling and others. It is to be noted that the vehicle is not limited to the electric vehicle, and the present invention is also effective for a so-called hybrid car in which the engine is used together with the electric motor for running. Furthermore, the present invention is also applicable to a usual car which runs with the engine.

The vehicle air conditioning device 1 of the embodiment performs air conditioning (heating, cooling, dehumidifying, and ventilation) of a vehicle interior of the electric vehicle, and there are successively connected, by a refrigerant pipe 13, an electric type of compressor 2 to which power is supplied from the battery of the vehicle to compress a refrigerant and to raise a pressure, a radiator 4 disposed in an air flow passage 3 of an HVAC unit 10 in which vehicle interior air passes and circulates, to let the high-temperature high-pressure refrigerant discharged from the compressor 2 radiate heat in the vehicle interior, an outdoor expansion valve (ECCV) 6 constituted of an electronic expansion valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electronic expansion valve (which may be a mechanical expansion valve) to decompress and expand the refrigerant, a heat absorber 9 disposed in the air flow passage 3 to let the refrigerant absorb heat from interior and exterior of the vehicle during the cooling and during the dehumidifying and heating, an evaporation capability control valve 11 which controls an evaporation capability in the heat absorber 9, an accumulator 12, and others, thereby constituting a refrigerant circuit R.

It is to be noted that the outdoor heat exchanger 7 is provided outside the vehicle interior, and in the outdoor heat exchanger 7, an outdoor blower 15 is provided to perform the heat exchange between the outdoor air and the refrigerant during stopping of the vehicle. Furthermore, the outdoor heat exchanger 7 has a header portion 14 and a subcooling portion 16 successively on a refrigerant downstream side, a refrigerant pipe 13A extending out from the outdoor heat exchanger 7 is connected to the header portion 14 via a solenoid valve (an opening/closing valve) 17 to be opened during the cooling, and an outlet of the subcooling portion 16 is connected to the indoor expansion valve 8 via a check valve 18. The header portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11.

Additionally, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve (an opening/closing valve) 21 to be opened during the heating. In addition, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve (an opening/closing valve) 22 to be opened during the dehumidifying.

Furthermore, in the air flow passage 3 on an air upstream side of the heat absorber 9, respective suction ports such as an indoor air suction port and an outdoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Further in FIG. 1, reference numeral 23 denotes a heating medium circulating circuit as an auxiliary heating means provided in the vehicle air conditioning device 1 of the embodiment. The heating medium circulating circuit 23 includes a circulating pump 30 constituting circulating means, a heating medium heating electric heater (a PTC heater) 35, and a heating medium-air heat exchanger 40 disposed in the air flow passage 3 on an air upstream side of the radiator 4 to flow of air of the air flow passage 3, and these components are successively annularly connected to one another by a heating medium pipe 23A. It is to be noted that as a heating medium to circulate in the heating medium circulating circuit 23, for example, water, a refrigerant such as HFO-1234yf, a coolant or the like is employed.

Then, when the circulating pump 30 is operated and the heating medium heating electric heater 35 is energized to heat, the heating medium (the high-temperature heating medium) heated by the heating medium heating electric heater 35 circulates through the heating medium-air heat exchanger 40. Consequently, the air flowing through the radiator 4 of the air flow passage 3 heats. When the controller 32 judges that a heating capability by the radiator 4 runs short in a heating mode as described later, the controller energizes the heating medium heating electric heater 35 to heat, and operates the circulating pump 30 to execute the heating by the heating medium-air heat exchanger 40 of the heating medium circulating circuit 23. That is, the heating medium-air heat exchanger 40 of the heating medium circulating circuit 23 becomes a so-called heater core, to complement the heating of the vehicle interior. The employing of the heating medium circulating circuit 23 improves electric safety of passengers.

Furthermore, in the air flow passage 3 on the air upstream side of the heating medium-air heat exchanger 40 and the radiator 4, an air mix damper 28 is disposed to adjust a degree at which the indoor air or outdoor air passes through the radiator 4. Further in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
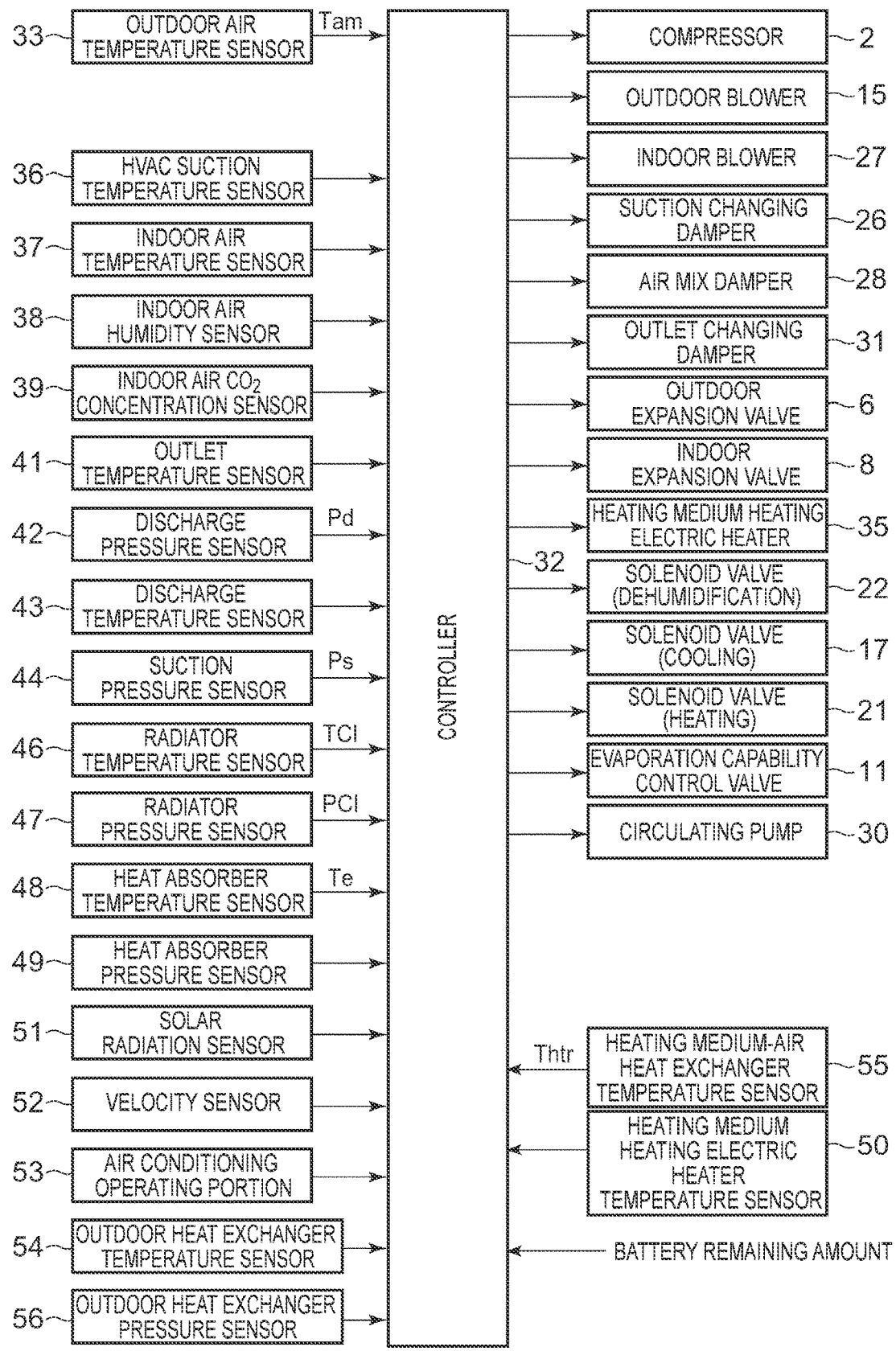
FIG. 2 is a block diagram of an electric circuit of a controller of the vehicle air conditioning device of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature Tam of the vehicle, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure Pd of the refrigerant discharged from the compressor 2, a discharge temperature sensor 43 which detects a temperature of the refrigerant discharged from the compressor 2, a suction pressure sensor 44 which detects a suction refrigerant pressure Ps of the compressor 2, a radiator temperature sensor 46 which detects a temperature TCI of the radiator 4 (the temperature of the radiator 4 itself or the temperature of the air heated in the radiator 4), a radiator pressure sensor 47 which detects a refrigerant pressure PCI of the radiator 4 (the pressure in the radiator 4 or of the refrigerant which has flowed out from the radiator 4), a heat absorber temperature sensor 48 which detects a temperature Te of the heat absorber 9 (the temperature of the heat absorber 9 itself or of the air cooled in the heat absorber 9), a heat absorber pressure sensor 49 which detects a refrigerant pressure of the heat absorber 9 (the pressure in the heat absorber 9 or of the refrigerant which has flowed out from the heat absorber 9), a solar radiation sensor 51 of, e.g., a photo sensor system to detect a solar radiation amount into the vehicle, a velocity sensor 52 to detect a moving speed (a velocity VSP) of the vehicle, an air conditioning operating portion 53 to set the changing of the temperature or the operation mode, an outdoor heat exchanger temperature sensor 54 which detects a temperature of the outdoor heat exchanger 7 (an evaporation temperature TXO of the refrigerant of the outdoor heat exchanger 7), and an outdoor heat exchanger pressure sensor 56 which detects a refrigerant pressure of the outdoor heat exchanger 7.

Furthermore, the input of the controller 32 is further connected to respective outputs of a heating medium heating electric heater temperature sensor 50 which detects a temperature of the heating medium heating electric heater 35 of the heating medium circulating circuit 23, and a heating medium-air heat exchanger temperature sensor 55 which detects a temperature of the heating medium-air heat exchanger 40 (hereinafter, referred to as an auxiliary heater temperature Thtr). Furthermore, information on a battery remaining amount that is an amount of the power charged in the battery mounted in the vehicle is also input into the controller 32.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17 and 21, the circulating pump 30, the heating medium heating electric heater 35 and the evaporation capability control valve 11. Then, the controller 32 controls these components on the basis of the outputs of the respective sensors and the setting input by the air conditioning operating portion 53.

Next, description will be made as to an operation of the vehicle air conditioning device 1 of the embodiment having the above constitution. The controller 32 changes and executes respective roughly divided operation modes of the heating mode, a dehumidifying and heating mode, an internal cycle mode, a dehumidifying and cooling mode, and a cooling mode. Initially, description will be made as to a flow of the refrigerant in each operation mode.

(1) Heating Mode

When the heating mode is selected by the controller 32 or a manual operation to the air conditioning operating portion 53, the controller 32 opens the solenoid valve 21 and closes the solenoid valve 17 and the solenoid valve 22. Then, the controller operates the compressor 2 and the respective blowers 15 and 27, and the air mix damper 28 has a state of passing the air blown out from the indoor blower 27 through the heating medium-air heat exchanger 40 and the radiator 4. In consequence, a high-temperature high-pressure gas refrigerant discharged from the compressor 2 flows into the radiator 4. The air in the air flow passage 3 passes through the radiator 4, and hence the air in the air flow passage 3 heats by the heating medium-air heat exchanger 40 (when the heating medium circulating circuit 23 is operating) and then heats by the high-temperature refrigerant in the radiator 4. On the other hand, the refrigerant in the radiator 4 has the heat taken by the air and is cooled to condense and liquefy.

The refrigerant liquefied in the radiator 4 flows through the refrigerant pipe 13E to reach the outdoor expansion valve 6 in which the refrigerant is decompressed, and then flows into the outdoor heat exchanger 7. The refrigerant flowing into the outdoor heat exchanger 7 evaporates, and the heat is pumped up from the outdoor air passed by running or the outdoor blower 15 (a heat pump). Then, the low-temperature refrigerant flowing out from the outdoor heat exchanger 7 flows through the refrigerant pipe 13D and the solenoid valve 21, and flows from the refrigerant pipe 13C into the accumulator 12 to perform gas-liquid separation, and the gas refrigerant is sucked into the compressor 2, thereby repeating this circulation. The air heated in the heating medium-air heat exchanger 40 and the radiator 4 is blown out from the outlet 29, thereby performing the heating of the vehicle interior.

The controller 32 controls a number of revolution of the compressor 2 on the basis of a high pressure (the radiator pressure PCI which will be described later) of the refrigerant circuit R which is detected by the discharge pressure sensor 42 or the radiator pressure sensor 47, controls a valve position of the outdoor expansion valve 6 on the basis of the temperature (the radiator temperature TCI) of the radiator 4 which is detected by the radiator temperature sensor 46, and controls a subcool degree SC of the refrigerant in an outlet of the radiator 4.

(2) Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior.

The controller 32 controls the number of revolution of the compressor 2 on the basis of the high pressure of the refrigerant circuit R which is detected by the discharge pressure sensor 42 or the radiator pressure sensor 47, and the controller controls the valve position of the outdoor expansion valve 6 on the basis of the temperature of the heat absorber 9 (the heat absorber temperature Te) which is detected by the heat absorber temperature sensor 48.

(3) Internal Cycle Mode

Next, in the internal cycle mode, the controller 32 closes (shuts off) the outdoor expansion valve 6 in the above state of the dehumidifying and heating mode. In other words, it can be considered that this internal cycle mode is a state where the outdoor expansion valve 6 is shut off by the control of the outdoor expansion valve 6 in the dehumidifying and heating mode, and hence the internal cycle mode can be regarded as a part of the dehumidifying and heating mode.

Thus, the outdoor expansion valve 6 is closed, thereby obstructing inflow of the refrigerant into the outdoor heat exchanger 7, and hence all the condensed refrigerant flowing through the radiator 4 and the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but the heating capability for a consumed power of the compressor 2 and additionally for a quantity of heat absorbed in the heat absorber 9 is exerted. The whole amount of the refrigerant flows through the heat absorber 9 which exerts a dehumidifying operation, and hence as compared with the above dehumidifying and heating mode, a dehumidifying capability is higher, but the heating capability lowers.

Furthermore, the controller 32 controls the number of revolution of the compressor 2 on the basis of the temperature of the heat absorber 9 or the above-mentioned high pressure of the refrigerant circuit R. At this time, the controller 32 selects a smaller compressor target number of revolution from compressor target numbers of revolution obtainable by calculations from the temperature Te of the heat absorber 9 and the high pressure PCI, to control the compressor 2.

(4) Dehumidifying and Cooling Mode

Next, in the dehumidifying and cooling mode, the controller 32 opens the solenoid valve 17 and closes the solenoid valve 21 and the solenoid valve 22. Then, the controller operates the compressor 2 and the respective blowers 15 and 27, and the air mix damper 28 has the state of passing the air blown out from the indoor blower 27 through the heating medium-air heat exchanger 40 and the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 heats by the high-temperature refrigerant in the radiator 4 (the heating medium circulating circuit 23 stops), whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior.

The controller 32 controls the number of revolution of the compressor 2 on the basis of the temperature of the heat absorber 9 which is detected by the heat absorber temperature sensor 48, also controls the valve position of the outdoor expansion valve 6 on the basis of the above-mentioned high pressure (the radiator pressure PCI) of the refrigerant circuit R, and controls the refrigerant pressure (the radiator pressure PCI which will be described later) of the radiator 4.

(5) Cooling Mode

Next, in the cooling mode, the controller 32 fully opens the outdoor expansion valve 6 in the above state of the dehumidifying and cooling mode (the valve position is adjusted to an upper limit of controlling), and the air mix damper 28 has a state where the air does not pass through the radiator 4. In consequence, the high-temperature high-pressure gas refrigerant discharged from the compressor 2 flows into the radiator 4. The air in the air flow passage 3 does not pass through the radiator 4, the refrigerant therefore only passes the radiator, and the refrigerant flowing out from the radiator 4 flows through the refrigerant pipe 13E to reach the outdoor expansion valve 6.

At this time, the outdoor expansion valve 6 is fully open, and hence the refrigerant flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The air blown out from the indoor blower 27 is cooled by the heat absorbing operation at this time.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4, but is blown out from the outlet 29 to the vehicle interior, thereby performing cooling of the vehicle interior. In this cooling mode, the controller 32 controls the number of revolution of the compressor 2 on the basis of the temperature Te of the heat absorber 9 which is detected by the heat absorber temperature sensor 48. Then, the controller 32 selects and changes the above respective operation modes in accordance with the outdoor air temperature and a target outlet temperature.

(6) Control of Compressor and Heating Medium Circulating Circuit in Heating Mode Next, description will be made as to the control of the compressor 2 and the heating medium circulating circuit 23 in the above-mentioned heating mode by the controller 32 with reference to FIG. 3 to FIG. 7.

(6-1) Calculation of Target Number of Revolution of Compressor by High Pressure (High Pressure Calculation Number of Revolution TGNChp)

The controller 32 calculates a target outlet temperature TAO from Equation (1) mentioned below. The target outlet temperature TAO is a target value of the temperature of the air blown out from the outlet 29 to the vehicle interior.

$$TAO=(Tset-Tin) \times K+Tbal(f(Tset,SUN,Tam)) \quad \text{Equation (1)},$$

in which Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Furthermore, in general, the lower the outdoor air temperature Tam is, the higher the target outlet temperature TAO becomes, and the higher the outdoor air temperature Tam is, the lower the target outlet temperature becomes.

The controller 32 calculates a radiator target temperature TCO from the target outlet temperature TAO, and next calculates a radiator target pressure PCO that is a target value of the high pressure of the refrigerant circuit R on the basis of the radiator target temperature TCO. Then, the controller 32 calculates the high pressure calculation number of revolution TGNChp that is a target value of a number of revolution NC of the compressor 2 on the basis of the radiator target pressure PCO and the refrigerant pressure (the radiator pressure, i.e., the high pressure of the refrigerant circuit R) PCI of the radiator 4 which is detected by the radiator pressure sensor 47.

That is, the high pressure calculation number of revolution TGNChp is the target number of revolution of the compressor 2 to execute control in accordance with the number of revolution NC of the compressor 2 so that the radiator pressure PCI (the high pressure) reaches the radiator target pressure PCO (the target value of the high pressure), but in this heating mode, the controller 32 has two types of operation modes of an energy saving prior mode and a comfort prior mode mentioned below, and is configured to change and execute these modes in accordance with a passenger's manual selecting operation by use of the air conditioning operating portion 53 or in accordance with the battery remaining amount.

(6-2) Change of Energy Saving Prior Mode and Comfort Prior Mode

Initially, when a passenger operates the air conditioning operating portion 53 to select the energy saving prior mode or when the battery remaining amount of the vehicle is smaller than a predetermined value, the controller 32 executes the energy saving prior mode which will be described later. Then, when the passenger does not select the energy saving prior mode and the battery remaining amount has the predetermined value or more, the controller executes the comfort prior mode which will be described later.

(6-3) Energy Saving Prior Mode in Heating Mode

Hereinafter, description will be made as to the above-mentioned energy saving prior mode of the controller 32 with reference to FIG. 4 and FIG. 5. In the energy saving prior mode, the controller 32 adjusts the number of revolution NC of the compressor 2 to a maximum number of revolution under the conditions to operate the compressor 2, and complements a shortage of the heating capability by the radiator 4 with heating by the heating medium circulating circuit 23 (the heating medium-air heat exchanger 40). Specifically, in step S1 of FIG. 4, the controller 32 judges whether or not judgment of a failure occurring in the heat pump (denoted with HP in FIG. 4) constituted of the refrigerant circuit R of the vehicle air conditioning device 1 is performed, and when the failure (N) is judged, the controller stops the heat pump (the compressor 2) in step S5.

When the failure is not judged in the step S1 and in a normal case (Y), the controller advances to step S2 to judge whether or not the operation mode of the vehicle air conditioning device 1 is the heating mode at present. In the case of a mode other than the heating mode (N), the controller shifts to the other operation mode, and in the heating mode (Y), the controller advances to step S3. In the step S3, the controller 32 calculates a required capability TGQ (kW) that is a required heating capability of the radiator 4, an HP maximum capability estimated value Qmax (kW) that is an estimated value of a maximum heating capability of the radiator 4, and a total capability Qtotal (kW) that is a total heating capability to be actually generated by the radiator 4 and the heating medium circulating circuit 23 (including the heating medium-air heat exchanger 40 that is the auxiliary heating means, and this also applies below) by use of Equation (2), Equation (3) and Equation (4) mentioned below.

$$TGQ=(TCO-Te) \times Cpa \times \text{actual } Ga \times \gamma aTe \times 1.16 \qquad \text{Equation (2)}$$

$$Qmax=f(Tam,Ga,NCmax,Thtr-Te) \qquad \text{Equation (3)}$$

$$Qtotal=(TCI-Te) \times Cpa \times \text{actual } Ga \times (SW/100) \times \gamma aTe \times 1.16 \qquad \text{Equation (4)}$$

It is to be noted that Te is the heat absorber temperature, Cpa is constant pressure specific heat (kJ/m$^3$·K) of air, actual Ga is an actual air volume (an actual system air volume m$^3$/s) of the air flowing through the air flow passage 3, γaTe is an air specific weight, 1.16 is a coefficient to match a unit, NCmax is the maximum number of revolution of the compressor 2 under the conditions, Thtr is the auxiliary heater temperature that is a temperature of the heating medium-air heat exchanger 40, TCI is the radiator temperature, and SW is a position of the air mix damper 28.

Furthermore, the controller 32 calculates a difference ΔQmax between the required capability TGQ and the HP maximum capability estimated value Qmax and a difference ΔQtotal between the required capability TGQ and the total capability Qtotal by use of Equation (5) and Equation (6) mentioned below.

$$\Delta Qmax=TGQ-Qmax \qquad \text{Equation (5)}$$

$$\Delta Qtotal=TGQ-Qtotal \qquad \text{Equation (6)}$$

Figure 3:
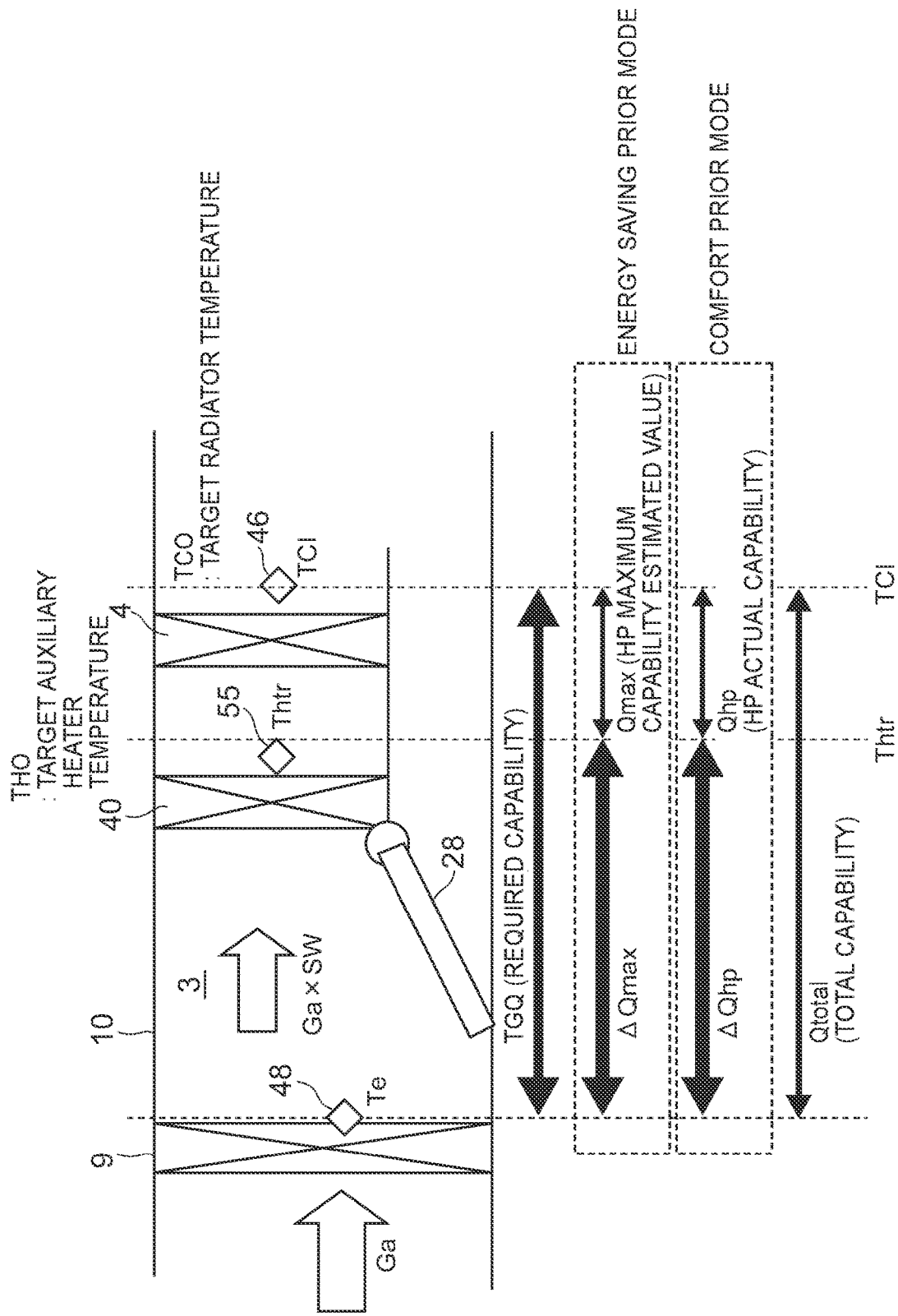
FIG. 3 is an enlarged view of an air flow passage portion of the vehicle air conditioning device of FIG. 1.

FIG. 3 shows a relation between each capability and the difference.

Next, the controller 32 judges whether or not to stop the heat pump (the compressor 2) in accordance with the frosting to the outdoor heat exchanger 7, or the like in step S4. In the case of increase of the frosting to the outdoor heat exchanger 7, heat absorption from the outside (the heat pump) is not achievable and an operation efficiency also remarkably deteriorates, even when the compressor 2 of the refrigerant circuit R is operated. In the step S4, the controller 32 calculates a frosting degree (a frosting ratio) of the outdoor heat exchanger 7 on the basis of a frosting judgment value ΔTXO (ΔTXO=TXObase−TXO) which is a difference between a refrigerant evaporation temperature TXObase of the outdoor heat exchanger 7 without the frosting and the current refrigerant evaporation temperature TXO, and when this frosting degree has a predetermined value or more (Y, HP stopping), the controller advances to the step S5 to stop the heat pump (the compressor 2 of the refrigerant circuit R).

When a judgment to stop the heat pump (the compressor 2) is not made in the step S4 (N, HP operation), the controller 32 adjusts the number of revolution NC of the compressor 2 to the maximum number of revolution under the conditions to operate the compressor 2. Then, the controller advances to step S8 to perform the judgment by an actual capability. In the embodiment, this judgment by the actual capability is to judge whether or not a predetermined time (e.g., 30 seconds or the like) elapses in a state where there are established all the conditions that the number of revolution NC of the compressor 2 is the maximum number of revolution, the high pressure of the refrigerant circuit R (the radiator pressure PCI) is sable and the difference ΔQtotal has a predetermined value or more. Now, immediately after startup of the compressor 2, the controller 32 judges (N) in the step S8 to advance to step S10, and performs a judgment by the maximum capability at this time.

This judgment by the maximum capability is executed immediately after the startup of the compressor 2 until the high pressure becomes stable (the case of N in the step S8), and in the embodiment, it is judged whether or not the difference ΔQmax (=TGQ−Qmax) between the required capability TGQ and the HP maximum capability estimated value Qmax has a predetermined value or more (a state where the maximum heating capability (estimated value) of the radiator 4 is short to the required capability TGQ). When a state where the difference is smaller than the predetermined value continues for the predetermined time (e.g., 30 seconds or the like), that is, when the maximum heating capability (estimated value) of the radiator 4 satisfies the required capability TGQ or hardly runs short (N), the controller advances to step S12 to bring the heating medium heating electric heater 35 of the heating medium circulating circuit 23 to a non-energizing state (PTC stop) and to set a required capability TGQhtr of the heating medium circulating circuit 23 (the auxiliary heating means) to zero.

On the startup of the compressor 2, when the difference ΔQmax (=TGQ−Qmax) between the required capability TGQ and the HP maximum capability estimated value Qmax has the predetermined value or more (the state where the maximum heating capability (estimated value) of the radiator 4 is short to the required capability TGQ) in the step S10 (Y), the controller 32 advances to step S11 to obtain a feedforward (F/F) value Qaff of the required capability TGQhtr of the heating medium circulating circuit 23 from ΔQmax, and to set a feedback (F/B) value Qafb to zero.

Next, the controller 32 advances to step S7 to calculate the required capability TGQhtr of the heating medium circulating circuit 23. In the step S7, the controller 32 calculates the required capability TGQhtr of the heating medium circulating circuit 23 by use of Equation (7) mentioned below.

$$TGQhtr=(Qaff+Qafb)/\phi \qquad \text{Equation (7)},$$

in which $\phi$ is a temperature efficiency (a heater temperature efficiency) of the heating medium circulating circuit 23 (the heating medium heating electric heater 35).

Furthermore, the compressor 2 reaches the maximum number of revolution, it is judged in the step S8 that the difference ΔQtotal between the required capability TGQ and the total capability Qtotal is smaller than the predetermined value (N) and then in the step S10, it is judged that the difference ΔQmax between the required capability TGQ and the HP maximum capability estimated value Qmax has the predetermined value or more. Also in this case, the controller 32 advances from the step S11 to the step S7 to calculate the required capability TGQhtr of the heating medium circulating circuit 23 by Equation (7) mentioned above. Specifically, in the step S11, Qaff=ΔQmax and Qafb=0, and hence in the step S7, the controller 32 obtains the required capability TGQhtr of the heating medium circulating circuit 23 from ΔQmax/$\phi$, to control energization to the heating medium heating electric heater 35 on the basis of the required capability TGQhtr.

On the other hand, when the predetermined time elapses in the state where the number of revolution NC of the compressor 2 is the maximum number of revolution, the high pressure (the radiator pressure PCI) of the refrigerant circuit R is stable and the difference ΔQtotal is the predetermined value or more in the step S8 (Y), the controller 32 advances to step S9 to obtain the F/F value Qaff of the required capability TGQhtr of the heating medium circulating circuit 23 from the difference ΔQmax and to obtain the F/B value Qafb from the difference ΔQtotal, and advances to the step S7 to calculate the required capability TGQhtr of the heating medium circulating circuit 23. Specifically, in the step S9, Qaff=ΔQmax and Qafb=Qtotal, and hence in the step S7, the controller 32 obtains the required capability TGQhtr of the heating medium circulating circuit 23 from (ΔQmax+ΔQtotal)/$\phi$, to control the energization to the heating medium heating electric heater 35 on the basis of the required capability TGQhtr. FIG. 5 shows a timing chart of each capability of the above energy saving prior mode and the number of revolution of the compressor 2. A range of cooperative controlling shows the range of the cooperative controlling of the heating by the radiator 4 of the heat pump (the refrigerant circuit R) and the heating by the heating medium circulating circuit 23, and a range of cooperative controlling cancellation shows a range where the controller stops the heating by the heating medium circulating circuit 23 and performs the heating only by the radiator 4. It is seen that in this cooperative controlling of the energy saving prior mode, the controller adjusts the number of revolution NC of the compressor 2 to the maximum number of revolution, and complements the shortage of the heating capability by the radiator 4 with the heating by the heating medium circulating circuit 23 (the heating medium-air heat exchanger 40).

Furthermore, a range of F/F control in the range of the cooperative controlling is a range where there are obtained the above-mentioned Qaff=ΔQmax and Qafb=0 and then the required capability TGQhtr=Qmax/$\phi$, and a range of F/B control is a range where there are obtained the above-mentioned Qaff=ΔQmax and Qafb=ΔQtotal and then the required capability TGQhtr=(Qmax+Qtotal)/$\phi$. It is seen that, when this F/B control is performed, the total capability Qtotal that is the total heating capability to be actually generated by the radiator 4 and the heating medium circulating circuit 23 (the heating medium-air heat exchanger 40) is controlled to reach the required capability TGQ.

It is to be noted that when the heat pump (the compressor 2) is stopped in the step S5, the controller 32 advances to step S6 to adjust the F/F value Qaff of the required capability TGQhtr of the heating medium circulating circuit 23 to the required capability TGQ and to set the F/B value Qafb to zero, and the controller advances to the step S7 to calculate the required capability TGQhtr of the heating medium circulating circuit 23. In other words, in the step S6, Qaff=the required capability TGQ and Qafb=0, and hence in the step S7, the controller 32 obtains the required capability TGQhtr of the heating medium circulating circuit 23 from TGQ/$\phi$, to control the energization to the heating medium heating electric heater 35 on the basis of the required capability TGQhtr.

(6-4) Another Energy Saving Prior Mode in Heating Mode

Figure 6:
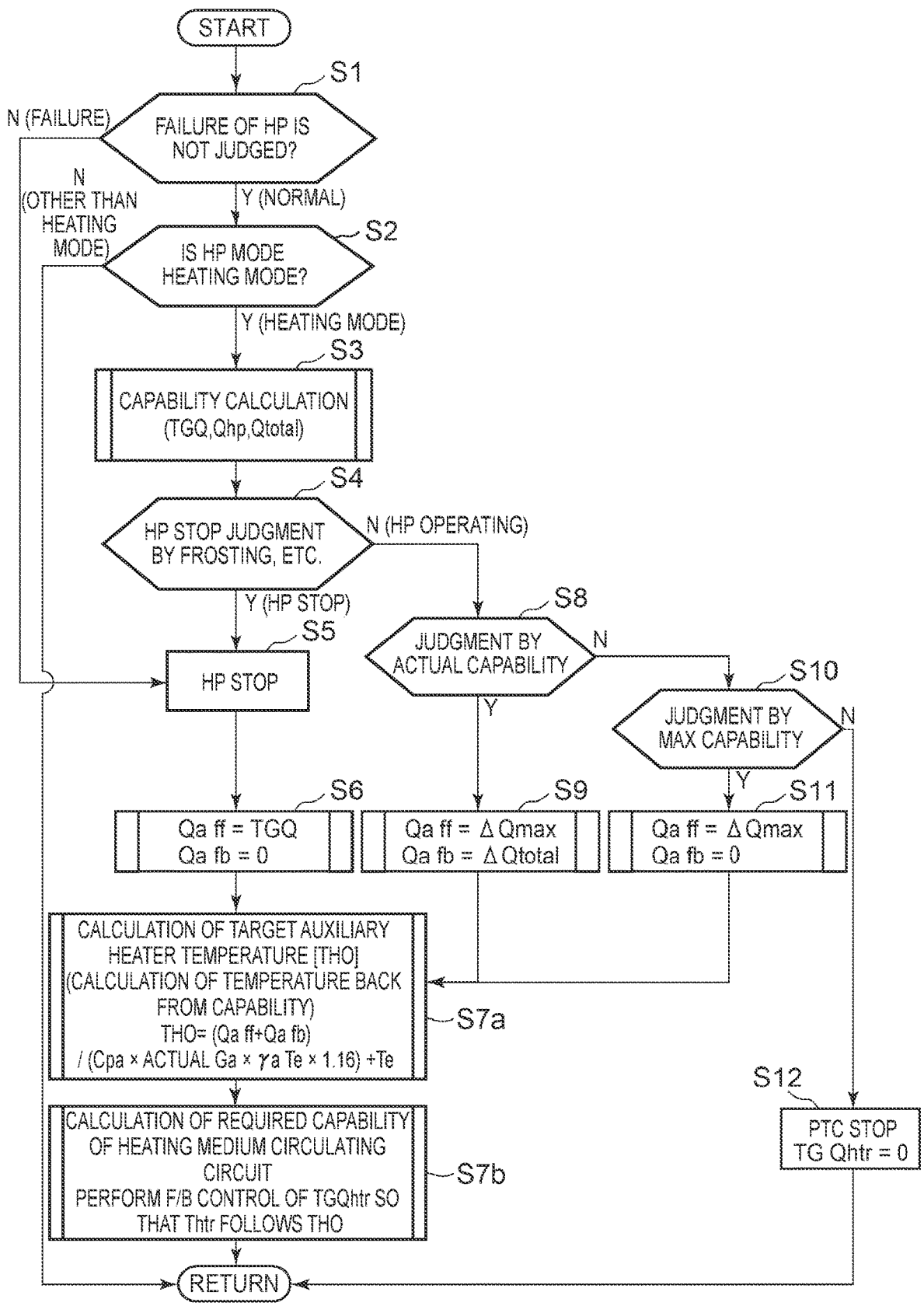
FIG. 6 is a flowchart to explain the energy saving prior mode of another example in the heating mode by the controller of FIG. 2.

Next, FIG. 6 shows another flowchart of the energy saving prior mode in the heating mode by the controller 32. It is to be noted that in this flowchart, in steps denoted with the same reference numerals as in FIG. 4, similar control is performed. In this case, the controller advances from the step S5, the step S9 and step S11 to step S7a and then advances to step S7b.

In the step S7a of FIG. 6, the controller 32 calculates a target auxiliary heater temperature THO that is a target value of the auxiliary heater temperature Thtr (the temperature of the heating medium-air heat exchanger 40) back from a sum (Qaff+Qafb) of the F/F value Qaff and the F/B value Qafb of the required capability TGQhtr of the heating medium circulating circuit 23 which is determined in the respective step S5, step S9 and step S11, by use of Equation (8) mentioned below.

$$THO=(Qaff+Qafb)/(Cpa \times \text{actual } Ga \times \gamma a Te \times 1.16)+Te \qquad \text{Equation (8)}$$

Next, in the step S7b, the controller 32 calculates the required capability TGQhtr of the heating medium circulating circuit 23, but in the embodiment, the controller 32 calculates the required capability TGQhtr of the heating medium circulating circuit 23 by PID calculation on the basis of a difference e between the target auxiliary heater temperature THO calculated back in the step S7a and the auxiliary heater temperature Thtr detected by the heating medium-air heat exchanger temperature sensor 55, and controls the energization to the heating medium heating electric heater 35 on the basis of the calculated required capability TGQhtr, thereby executing the feedback (F/B) control so that the auxiliary heater temperature Thtr follows the target auxiliary heater temperature THO.

(6-5) Comfort Prior Mode in Heating Mode

Figure 7:
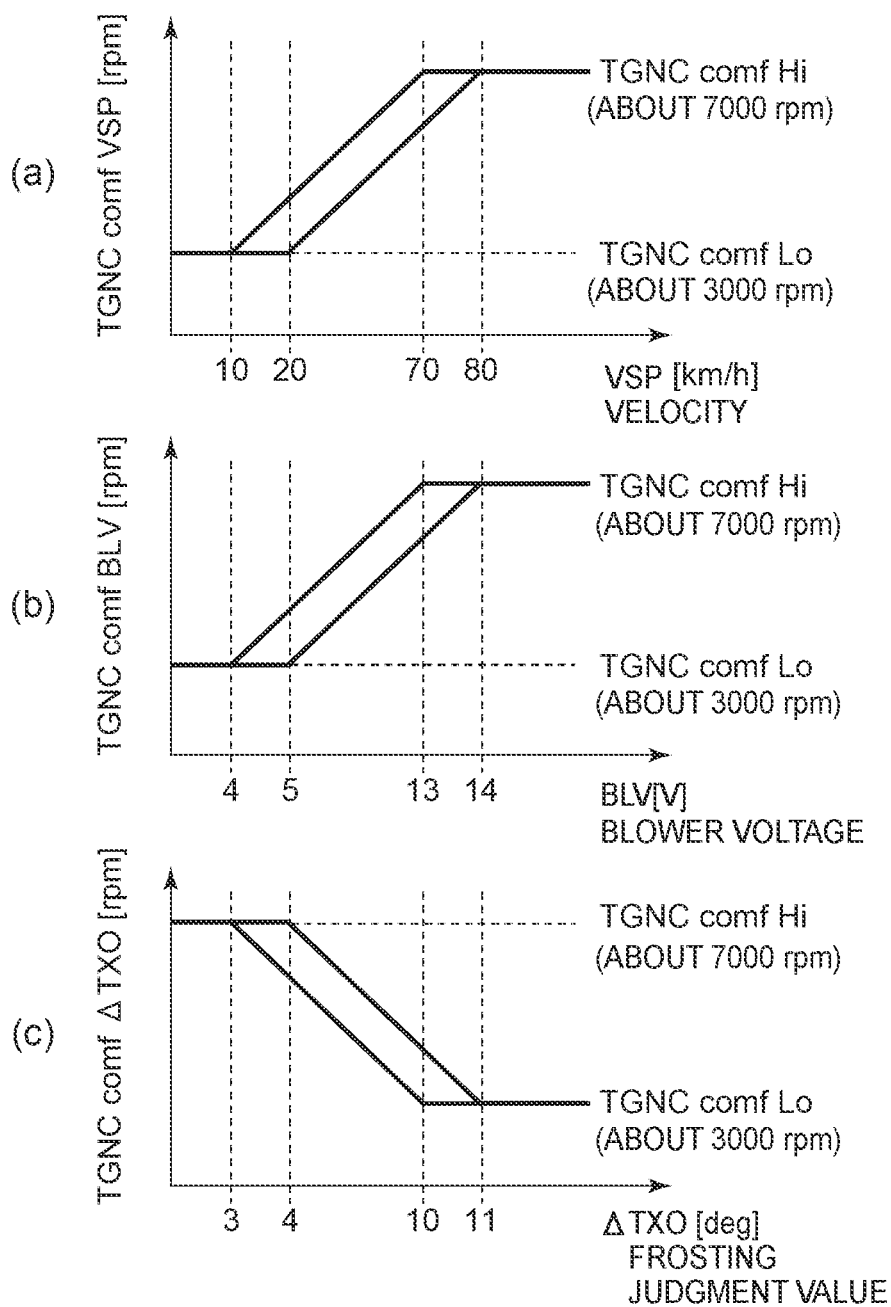
FIG. 7 is a diagram to explain change of an upper limit number of revolution TGNCcomf in a comfort prior mode of the heating mode by the controller of FIG. 2.

Next, description will be made as to the above-mentioned comfort prior mode of the controller 32 with reference to FIG. 7 and FIG. 8. In the heating mode, when the passenger does not select the energy saving prior mode and the battery remaining amount has the predetermined value or more, the controller 32 executes the comfort prior mode as described above.

(6-5-1) Control of Number of Revolution of Compressor 2 in Comfort Prior Mode

In this comfort prior mode, the controller 32 limits the number of revolution NC of the compressor 2, and complements the shortage of the heating capability by the radiator 4 at the limited number of revolution NC with the heating by the heating medium circulating circuit 23 (the heating medium-air heat exchanger 40). Initially, description will be made as to a limiting operation of the number of revolution NC of the compressor 2 in the comfort prior mode with reference to FIG. 7.

The controller 32 calculates an upper limit number of revolution TGNCcomf of the compressor 2 in the comfort prior mode by use of Equation (9) mentioned below on the basis of the velocity VSP of the vehicle which is detected by the velocity sensor 52, a blower voltage BLV and the frosting judgment value ΔTXO mentioned above.

$$TGNCcomf = MIN(TGNCcomfVSP, TGNCcomfBLV, TGNCcomf\Delta TXO) \qquad \text{Equation (9)}$$

In this equation, the blower voltage BLV is a voltage of the indoor blower (the blower fan) 27, and is an index indicating a volume of air flowing through the air flow passage 3. Furthermore, the frosting judgment value ΔTXO is a difference (ΔTXO=TXObase−TXO) between the refrigerant evaporation temperature TXObase of the outdoor heat exchanger 7 without the frosting and the current refrigerant evaporation temperature TXO, and indicates the frosting degree (the frosting ratio) of the outdoor heat exchanger 7.

Furthermore, TGNCcomfVSP is an upper limit number of revolution of the compressor 2 which is calculated from the velocity, and is changed between a predetermined lower limit TGNCcomfLo (e.g., about 3000 rpm) and an upper limit TGNCcomfHi (e.g., about 7000 rpm) in accordance with the velocity VSP as shown in FIG. 7(a), to heighten at a predetermined change ratio as the velocity VSP rises, for example, from 20 km/h to 80 km/h (i.e., as running noise enlarges), and to lower at a predetermined change ratio as the velocity lowers from 70 km/h to 10 km/h (with hysteresis).

Additionally, TGNCcomfBLV is an upper limit number of revolution of the compressor 2 which is calculated from the blower voltage, and is changed between the predetermined lower limit TGNCcomfLo and the upper limit TGNCcomfHi in accordance with the blower voltage BLV as shown in FIG. 7(b), to heighten at a predetermined change ratio as the blower voltage BLV rises, for example, from 5 V to 14 V (i.e., as outlet noise by the indoor blower 27 enlarges), and to lower at a predetermined change ratio as the blower voltage lowers from 13 V to 4 V (with hysteresis).

In addition, TGNCcomfΔTXO is an upper limit number of revolution of the compressor 2 which is calculated from the frosting degree, and is changed between the predetermined lower limit TGNCcomfLo and the upper limit TGNCcomfHi in accordance with the frosting judgment value ΔTXO as shown in FIG. 7(c), to lower at a predetermined change ratio as the frosting judgment value ΔTXO increases, for example, from 4 deg. to 11 deg. (i.e., as the frosting to the outdoor heat exchanger 7 increases), and to heighten at a predetermined change ratio as the value decreases from 10 deg. to 3 deg. (with hysteresis).

The controller 32 determines the smallest value in these changed upper limit numbers of revolution TGNCcomfVSP, TGNCcomfBLV and TGNCcomfΔTXO as the upper limit number of revolution TGNCcomf of the compressor 2 in the comfort prior mode, by use of Equation (9) mentioned above.

Next, the controller 32 calculates a target number of revolution TGNC of the compressor 2 in the comfort prior mode by use of Equation (10) mentioned below.

$$TGNC = MIN(TGNCcomf, TGNChp) \qquad \text{Equation (10)}$$

The above TGNChp is the high pressure calculation number of revolution that is the target value of the number of revolution NC of the compressor 2 which is calculated on the basis of the radiator target pressure PCO and the radiator pressure PCI mentioned above. In other words, the controller 32 determines, as the target number of revolution TGNC of the compressor 2, a smaller value selected from the upper limit number of revolution TGNCcomf and the high pressure calculation number of revolution TGNChp mentioned above in the comfort prior mode, to control the number of revolution NC of the compressor 2.

(6-5-2) Control of Heating Medium Circulating Circuit 23 in Comfort Prior Mode

Figure 8:
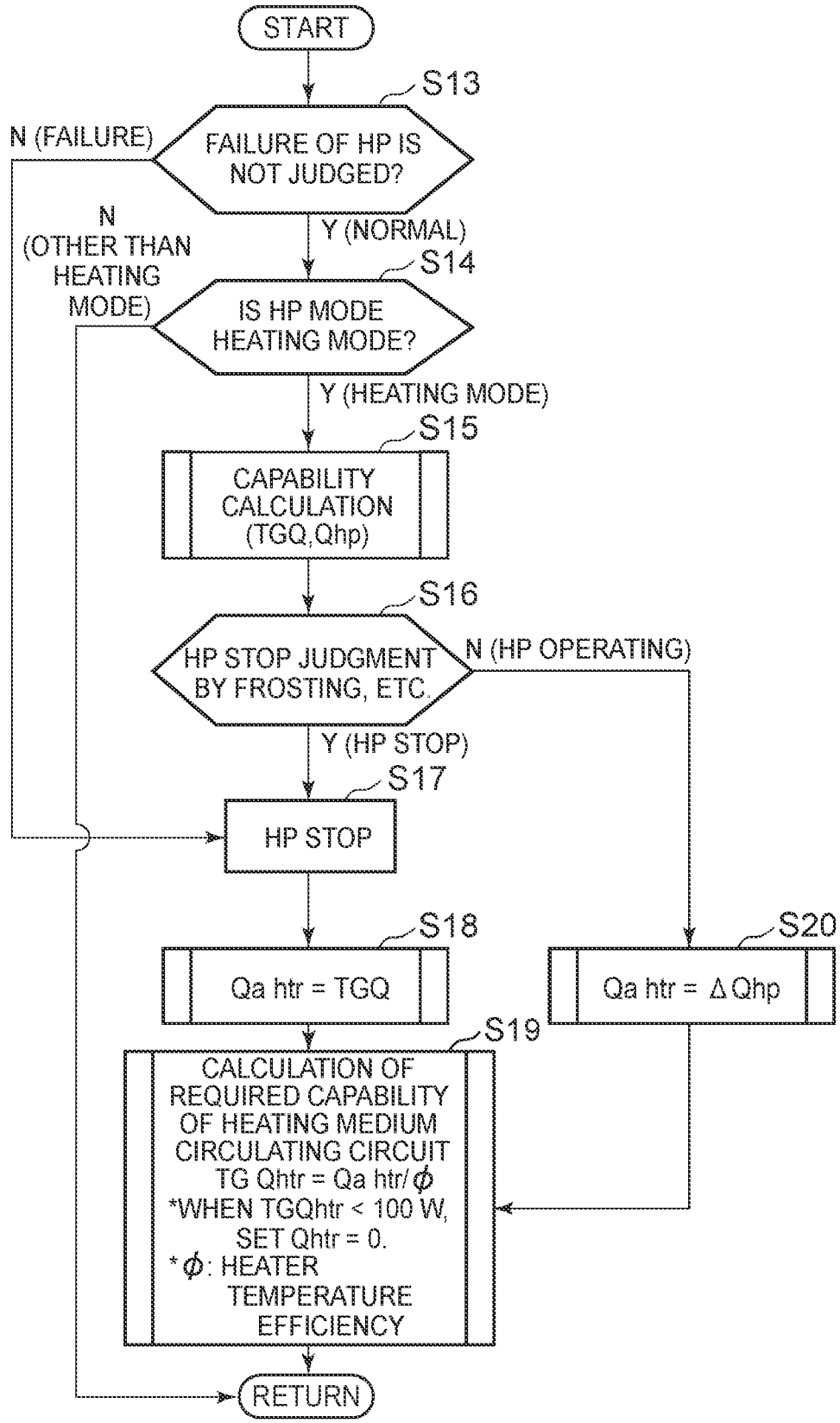
FIG. 8 is a flowchart to explain the comfort prior mode in the heating mode by the controller of FIG. 2.

Next, in step S13 of FIG. 8, the controller 32 judges whether or not judgment of a failure occurring in the heat pump (denoted with HP also in FIG. 8) constituted of the refrigerant circuit R of the vehicle air conditioning device 1 is performed, and when the failure (N) is judged, the controller stops the heat pump (the compressor 2) in step S17. When the failure is not judged in the step S13 and in a normal case (Y), the controller advances to step S14 to judge whether or not the operation mode of the vehicle air conditioning device 1 is the heating mode at present. In the case of a mode other than the heating mode (N), the controller shifts to the other operation mode, and in the heating mode (Y), the controller advances to step S15.

In the step S15, the controller 32 calculates the required capability TGQ (kW) that is the required heating capability of the radiator 4 and an HP actual capability Qhp (kW) that is the heating capability to be actually generated by the radiator 4 by use of Equation (2) mentioned above and Equation (11) mentioned below.

$$Qhp = (TCI - Thtr) \times Cpa \times \text{actual } Ga \times (SW/100) \times \gamma aTe \times 1.16 \qquad \text{Equation (11)}$$

Furthermore, the controller 32 calculates a difference ΔQhp between the required capability TGQ and the HP actual capability Qhp by use of Equation (12) mentioned below.

$$\Delta Qhp = TGQ - Qhp \qquad \text{Equation (12)}$$

FIG. 3 shows a relation between each capability and the difference.

Figure 4:
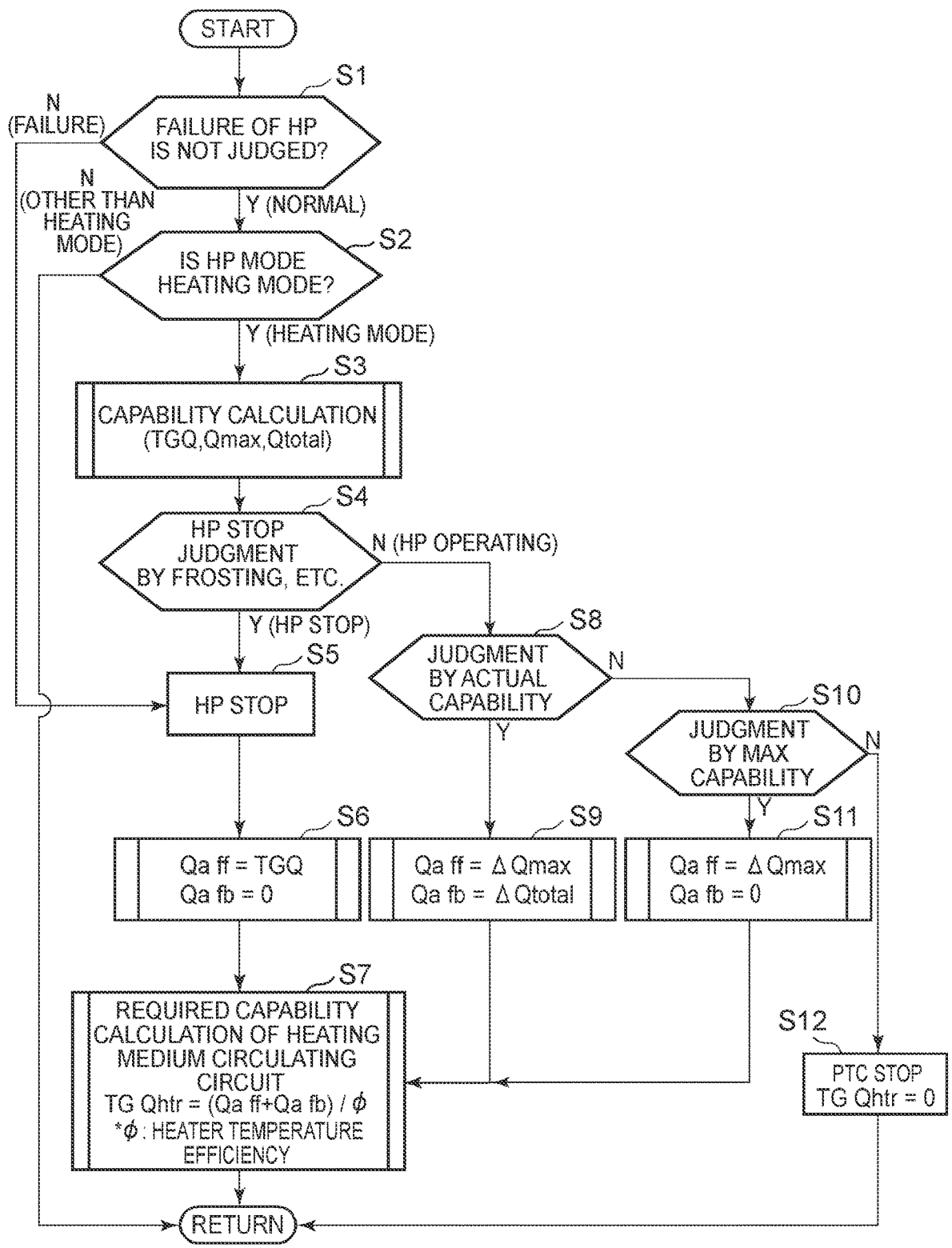
FIG. 4 is a flowchart to explain an energy saving prior mode in a heating mode by the controller of FIG. 2.
Figure 5:
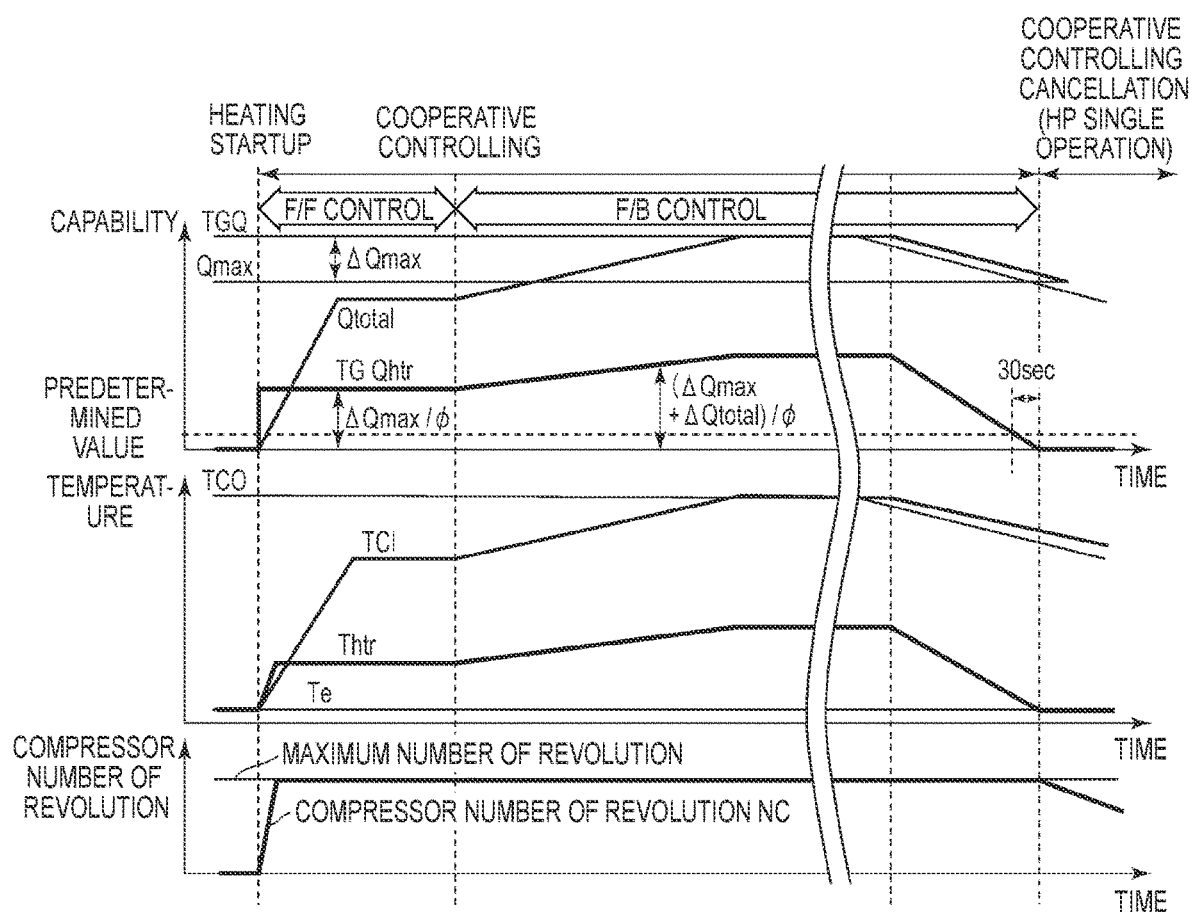
FIG. 5 is a timing chart to explain the energy saving prior mode of FIG. 4.

Next, the controller 32 judges whether or not to stop the heat pump (the compressor 2) in accordance with the frosting to the outdoor heat exchanger 7, or the like in step S16 similarly to the step S4 of FIG. 4, and when the frosting degree has a predetermined value or more (Y, HP stop), the controller advances to the step S17 to stop the heat pump (the compressor 2 of the refrigerant circuit R). On the other hand, when the judgment to stop the heat pump (the compressor 2) is not performed in the step S16 (N, HP operating), the controller 32 controls the number of revolution NC of the compressor 2 so that the number becomes equal to the target number of revolution TGNC that is a smaller value selected from values of the upper limit number of revolution TGNCcomf and the high pressure calculation number of revolution TGNChp mentioned above.

Then, the controller advances to step S20 to obtain a base value Qahtr of the required capability TGQhtr of the heating medium circulating circuit 23 from ΔQhp. Next, the controller 32 advances to step S19 to calculate the required capability TGQhtr of the heating medium circulating circuit 23. In the step S19, the controller 32 calculates the required capability TGQhtr of the heating medium circulating circuit 23 by use of Equation (13) mentioned below.

$$TGQhtr = Qahtr/\phi \qquad \text{Equation (13)}$$

Specifically, in the step S20, Qahtr=ΔQhp, and hence in the step S19, the controller 32 obtains the required capability TGQhtr of the heating medium circulating circuit 23 from ΔQhp/ϕ, and controls the energization to the heating medium heating electric heater 35 on the basis of the required capability TGQhtr.

On the other hand, on stopping the heat pump (the compressor 2) in the step S17, the controller 32 advances to step S18 to adjust the base value Qahtr of the required capability TGQhtr of the heating medium circulating circuit 23 to the required capability TGQ, and advances to the step S19 to calculate the required capability TGQhtr of the heating medium circulating circuit 23. That is, in the step S18, Qahtr=the required capability TGQ, and hence in the step S19, the controller 32 obtains the required capability TGQhtr of the heating medium circulating circuit 23 from TGQ/ϕ, to control the energization to the heating medium heating electric heater 35 on the basis of the required capability TGQhtr.

It is to be noted that when the required capability TGQhtr calculated in the step S19 is smaller than a predetermined value (e.g., 100 W), the controller 32 judges that a change due to the heating by the heating medium circulating circuit 23 (the heating medium heating electric heater 35) is small (is almost meaningless), to stop the heating medium circulating circuit 23 (does not energize the heating medium heating electric heater 35 and the circulating pump 30).

As described above in detail, in the present invention, the controller 32 have two types of modes, i.e., the energy saving prior mode and the comfort prior mode in the heating mode. In the energy saving prior mode, the controller operates the compressor 2 at the maximum number of revolution and complements the shortage of the heating capability by the radiator 4 with the heating by the heating medium circulating circuit 23 (the heating medium-air heat exchanger 40), and in the comfort prior mode, the controller limits the number of revolution of the compressor 2 and complements the shortage of the heating capability by the radiator 4 with the heating by the heating medium circulating circuit 23. Consequently, in the energy saving prior mode, the controller can let the radiator 4 exert the maximum heating capability and complement the shortage with the heating by the heating medium circulating circuit 23, thereby achieving decrease of power consumption, and in the comfort prior mode, the controller can limit the heating capability by the radiator 4, and increase the heating by the heating medium circulating circuit 23 to accelerate rising of the heating capability on startup or the like, thereby reducing the noise and inhibiting the frosting to the outdoor heat exchanger 7.

That is, it is possible to change whether to perform the vehicle interior heating in which priority is placed on energy saving or to perform the vehicle interior heating in which priority is placed on comfort, in accordance with passenger's preference or a vehicle situation, and it is possible to achieve the vehicle interior heating in which the comfort is compatible with the decrease of the power consumption.

In this case, in the embodiment, the controller 32 is configured to execute the comfort prior mode when the battery remaining amount of the vehicle has the predetermined value or more, and hence due to the execution of the comfort prior mode, there is effectively avoidable the disadvantage that the battery remaining amount of the power to be supplied to the compressor 2 or the heating medium heating electric heater 35 of the heating medium circulating circuit 23 runs out. Therefore, the invention is remarkably effective especially in the electric vehicle.

Furthermore, in the energy saving prior mode, the controller 32 calculates the required capability TGQ that is the required heating capability of the radiator 4, the HP maximum capability estimated value Qmax that is the estimated value of the maximum heating capability of the radiator 4, the total capability Qtotal that is the total heating capability to be actually generated by the radiator 4 and the heating medium circulating circuit 23, the difference ΔQmax=TGQ−Qmax which is the difference between the required capability TGQ and the HP maximum capability estimated value Qmax, and the difference ΔQtotal=TGQ−Qtotal which is the difference between the required capability TGQ and the total capability Qtotal, and obtains the required capability TGQhtr of the heating medium circulating circuit 23 from ΔQmax+ΔQtotal to execute the heating by the heating medium-air heat exchanger 40. Consequently, also when the required capability TGQ is not actually achievable with the difference ΔQmax between the required capability and the HP maximum capability estimated value Qmax due to the frosting to the outdoor heat exchanger 7, or the like, it is possible to accurately compensate for the shortage with the difference ΔQtotal between the required capability and the total capability Qtotal to be actually generated by the radiator 4 and the heating medium circulating circuit 23, and the complementation of the heating capability for the comfort by the heating medium-air heat exchanger 40 of the heating medium circulating circuit 23 is achievable.

In this case, the controller 32 obtains the required capability TGQhtr of the heating medium circulating circuit 23 from ΔQmax to execute the heating by the heating medium-air heat exchanger 40, when the difference ΔQtotal between the required capability TGQ and the total capability Qtotal is smaller than the predetermined value. Consequently, when the total capability Qtotal actually generated by the radiator 4 and the heating medium circulating circuit 23 substantially satisfies the required capability TGQ, the controller controls the heating medium circulating circuit 23 only with the difference ΔQmax between the required capability TGQ and the HP maximum capability estimated value Qmax, and it is possible to simplify the control of the heating medium circulating circuit 23.

Furthermore, in the case of stopping the compressor 2, the controller 32 obtains the required capability TGQhtr of the heating medium circulating circuit 23 from the required capability TGQ, to execute the heating by the heating medium-air heat exchanger 40. Consequently, when the compressor 2 is to be stopped due to increase of the frosting to the outdoor heat exchanger 7 or another factor, the comfortable vehicle interior heating is achievable with the heating by the heating medium-air heat exchanger 40 of the heating medium circulating circuit 23 without hindrance.

On the other hand, in the comfort prior mode, the controller 32 calculates the required capability TGQ that is the required heating capability of the radiator 4, the HP actual capability Qhp that is the heating capability to be actually generated by the radiator 4, and the difference ΔQhp=TGQ−Qhp which is the difference between the required capability TGQ and the HP actual capability Qhp, and obtains the required capability TGQhtr of the heating medium circulating circuit 23 from the difference ΔQhp, to execute the heating by the heating medium-air heat exchanger 40. Consequently, it is possible to accurately complement the shortage of the HP actual capability Qhp that is the heating capability of the radiator 4 which is actually generated at the limited number of revolution of the compressor 2, to the required capability TGQ, with the heating by the heating medium-air heat exchanger 40 of the heating medium circulating circuit 23, and extremely comfortable vehicle interior heating is achievable.

Also in this case, in the case of stopping the compressor 2, the controller 32 obtains the required capability TGQhtr of the heating medium circulating circuit 23 from the required capability TGQ, to execute the heating by the heating medium-air heat exchanger 40. Consequently, when the compressor 2 is similarly to be stopped due to the increase of the frosting to the outdoor heat exchanger 7 or the other factor, the comfortable vehicle interior heating is achievable with the heating by the heating medium-air heat exchanger 40 of the heating medium circulating circuit 23 without hindrance.

Furthermore, in the comfort prior mode, the controller 32 calculates the target value of the high pressure (the radiator target pressure PCO) on the basis of the target outlet temperature TAO that is the target value of the temperature of the air to be blown out to the vehicle interior, calculates the high pressure calculation number of revolution TGNChp of the compressor 2 so that the high pressure (the radiator pressure PCI) reaches the radiator target pressure PCO (the target value), and controls the operation of the compressor 2 on the basis of the smaller value which is selected, as the target number of revolution TGNC of the compressor 2, from the values of the high pressure calculation number of revolution TGNChp and the predetermined upper limit number of revolution TGNCcomf of the compressor 2 in the comfort prior mode. Consequently, the limitation of the number of revolution in the comfort prior mode is achievable while securing the control of the inherent number of revolution NC of the compressor 2 on the basis of the high pressure (the radiator pressure PCI).

Also in this case, the controller 32 changes the upper limit number of revolution TGNCcomf of the compressor 2 in the comfort prior mode on the basis of the velocity VSP, the blower voltage BLV that is the index indicating the volume of the air flowing through the air flow passage, and the frosting judgment value ΔTXO indicating the frosting degree of the outdoor heat exchanger 7. Consequently, in the embodiment, the controller 32 increases the upper limit number of revolution TGNCcomf as the velocity VSP is higher and as the volume of the air through the air flow passage 3 is larger, so that the heating capability of the radiator 4 increases to decrease the power consumption as much as possible in a situation where the noise is hardly a concern. On the other hand, the controller decreases the upper limit number of revolution TGNCcomf as the outdoor heat exchanger 7 is frosted more, so that it is possible to inhibit progress of the frosting to the outdoor heat exchanger 7.

(6-6) Another Example of Control of Heating Medium Circulating Circuit 23 in Energy Saving Prior Mode It is to be noted that the controller may execute feedback (F/B) control to increase the required capability TGQhtr of the heating medium circulating circuit 23, for example, when the high pressure (the radiator pressure PCI) is lower than the radiator target pressure PCO as much as the predetermined value or more even at the maximum number of revolution of the compressor 2 which is allowed at this time, or when the number of revolution NC of the compressor 2 is decreased due to low pressure protection of the compressor 2 by the suction refrigerant pressure Ps of the compressor 2 which is detected by the suction pressure sensor 44 (which may be estimated from a suction refrigerant temperature) and the radiator pressure PCI is lower than the radiator target pressure PCO. Consequently, the heating by the heating medium-air heat exchanger 40 increases, and hence when the radiator 4 is positioned on the downstream side of the air flow as in the embodiment, the radiator pressure PCI can be raised and brought closer to the radiator target pressure PCO.

It is to be noted that in the above-mentioned embodiment, when executing the control to change the energy saving prior mode and the comfort prior mode, in the energy saving prior mode, the controller obtains the required capability TGQhtr of the heating medium circulating circuit 23 from ΔQmax+ΔQtotal, but the invention of claim 4 is not limited to this example, and is effective in the vehicle air conditioning device which executes the cooperative controlling of the heating by the radiator 4 and the heating by the heating medium-air heat exchanger 40 of the heating medium circulating circuit 23.

Thus, the required capability TGQhtr of the heating medium circulating circuit 23 is obtained from ΔQmax+ΔQtotal in the energy saving prior mode to adjust the number of revolution NC of the compressor 2 to the maximum number of revolution. Consequently, when the required capability TGQ cannot actually be satisfied with the heating by the radiator 4, it is possible to accurately control the total capability Qtotal so that the total capability becomes equal to the required capability TGQ, and the invention is extremely effective.

Furthermore, in the embodiment, the present invention is applied to the vehicle air conditioning device 1 which changes and executes the respective operation modes of the heating mode, the dehumidifying and heating mode, the dehumidifying and cooling mode, and the cooling mode, but the present invention is not limited to the embodiment, and the present invention is also effective for another device that only performs the heating mode.

Additionally, the heating medium circulating circuit 23 constitutes the auxiliary heating means in the embodiment, but the present invention is not limited to this embodiment, and a usual electric heater (PTC) may be provided as the auxiliary heating means in the air flow passage 3. Furthermore, the constitution or each numeric value of the refrigerant circuit R described above in the embodiments does not restrict the present invention, and is changeable without departing from the gist of the present invention.

DESCRIPTION OF REFERENCE NUMERALS 1 vehicle air conditioning device
2 compressor
3 air flow passage
4 radiator
6 outdoor expansion valve 7 outdoor heat exchanger
8 indoor expansion valve
9 heat absorber
17, 20, 21 and 22 solenoid valve
23 heating medium circulating circuit (an auxiliary heating means)
26 suction changing damper
27 indoor blower (a blower fan)
28 air mix damper
30 circulating pump
32 controller (a control means)
35 heating medium heating electric heater (an electric heater)
40 heating medium-air heat exchanger (the auxiliary heating means)
R refrigerant circuit

The invention claimed is:

1. A vehicle air conditioning device comprising:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
an outdoor heat exchanger disposed outside the vehicle interior to let the refrigerant absorb heat, and
a control means configured to let the refrigerant discharged from the compressor to radiate heat in the radiator, and to decompress the refrigerant from which the heat has been radiated, enabling the refrigerant to absorb heat in the outdoor heat exchanger, thereby heating the vehicle interior;
the vehicle air conditioning device further comprising an auxiliary heating means for heating the air to be supplied from the air flow passage to the vehicle interior and an air conditioning operating portion to set the changing of the operation mode;
wherein the control means has an energy saving prior mode in which the control means fixes the number of revolutions per minute of the compressor at a maximum number of revolutions per minute and complements a shortage of a heating capability by the radiator with the heating by the auxiliary heating means,
a comfort prior mode in which the control means limits a number of revolutions per minute of the compressor and complements the shortage of the heating capability by the radiator with the heating by the auxiliary heating means, and
the energy saving prior mode and the comfort prior mode can be selected by a passenger operating the air conditioning operating portion.

2. The vehicle air conditioning device according to claim 1,
wherein power is supplied to the compressor and the auxiliary heating means from a battery of a vehicle, and
the control means is configured to execute the comfort prior mode when a remaining amount of the battery is greater than or equal to a predetermined value.

3. The vehicle air conditioning device according to claim 1, wherein in the energy saving prior mode, the control means calculates:
a required capability TGQ that is a required heating capability of the radiator,
a heat pump (HP) maximum capability estimated value Qmax that is an estimated value of a maximum heating capability of the radiator,
a total capability Qtotal that is a total heating capability to be actually generated by the radiator and the auxiliary heating means,
a difference DQmax=TGQ−Qmax which is the difference between the required capability TGQ and the HP maximum capability estimated value Qmax, and
a difference DQtotal=TGQ−Qtotal which is the difference between the required capability TGQ and the total capability Qtotal, and
obtains a required capability TGQhtr of the auxiliary heating means from the difference DQmax+the difference DQtotal, to execute the heating by the auxiliary heating means.

4. The vehicle air conditioning device according to claim 3, wherein
the control means obtains the required capability TGQhtr of the auxiliary heating means from the difference DQmax, to execute the heating by the auxiliary heating means, when the difference DQtotal between the required capability TGQ and the total capability Qtotal is smaller than a predetermined value.

5. The vehicle air conditioning device according to claim 3,
wherein the control means calculates a target value of a high pressure on the basis of a target outlet temperature that is a target value of a temperature of air to be blown out to the vehicle interior, and increases the required capability TGQhtr of the auxiliary heating means so that the high pressure reaches the target value.

6. The vehicle air conditioning device according to claim 3,
wherein, in the case of stopping the compressor, the control means obtains the required capability TGQhtr of the auxiliary heating means from the required capability TGQ, to execute the heating by the auxiliary heating means.

7. The vehicle air conditioning device according to claim 1, wherein, in the comfort prior mode, the control means calculates:
a required capability TGQ that is a required heating capability of the radiator,
an HP actual capability Qhp that is a heating capability to be actually generated by the radiator, and
a difference DQhp=TGQ−Qhp which is the difference between the required capability TGQ and the HP actual capability Qhp, and
obtains a required capability TGQhtr of the auxiliary heating means from the difference DQhp, to execute the heating by the auxiliary heating means.

8. The vehicle air conditioning device according to claim 7,
wherein, in the case of stopping the compressor, the control means obtains the required capability TGQhtr of the auxiliary heating means from the required capability TGQ, to execute the heating by the auxiliary heating means.

9. The vehicle air conditioning device according to claim 1,
wherein, in the comfort prior mode, the control means calculates a target value of a high pressure on the basis of a target outlet temperature that is a target value of a temperature of air to be blown out to the vehicle interior, calculates a high pressure calculation number of revolutions per minute TGNChp of the compressor so that the high pressure reaches the target value, and controls the operation of the compressor on the basis of a smaller value which is selected, as a target number of revolutions per minute TGNC of the compressor, from values of the high pressure calculation number of revolutions per minute TGNChp and a predetermined upper limit number of revolutions per minute TGNCcomf of the compressor in the comfort prior mode.

10. The vehicle air conditioning device according to claim 9,
wherein the control means changes the upper limit number of revolutions per minute TGNCcomf on the basis of a velocity, an index indicating a volume of air flowing through the air flow passage, and a frosting degree of the outdoor heat exchanger.

11. A vehicle air conditioning device comprising:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
an outdoor heat exchanger disposed outside the vehicle interior to let the refrigerant absorb heat, and
a control means configured to let the refrigerant discharged from the compressor to radiate heat in the radiator, and to decompress the refrigerant from which the heat has been radiated, to let the refrigerant absorb heat in the outdoor heat exchanger, thereby heating the vehicle interior,
the vehicle air conditioning device further comprising an auxiliary heating means for heating the air to be supplied from the air flow passage to the vehicle interior;
wherein the control means calculates:
a required capability TGQ that is a required heating capability of the radiator,
a heat pump (HP) maximum capability estimated value Qmax that is an estimated value of a maximum heating capability of the radiator,
a total capability Qtotal that is a total heating capability to be actually generated by the radiator and the auxiliary heating means,
a difference DQmax=TGQ−Qmax which is the difference between the required capability TGQ and the HP maximum capability estimated value Qmax, and
a difference DQtotal=TGQ−Qtotal which is the difference between the required capability TGQ and the total capability Qtotal, and
obtains a required capability TGQhtr of the auxiliary heating means from the difference DQmax+the difference DQtotal, to execute the heating by the auxiliary heating means.

* * * * *